United States Patent [19]

Pillekamp

[11] Patent Number: 5,627,823
[45] Date of Patent: May 6, 1997

[54] WIRE-FREE TELECOMMUNICATIONS SYSTEM, PREFERABLY A CORDLESS TELECOMMUNICATIONS SYSTEM

[75] Inventor: Klaus-Dieter Pillekamp, Erkrath, Germany

[73] Assignee: Siemens Aktiengesellschaft, Munich, Germany

[21] Appl. No.: 428,086

[22] PCT Filed: Nov. 2, 1993

[86] PCT No.: PCT/DE93/01044

§ 371 Date: May 1, 1995

§ 102(e) Date: May 1, 1995

[87] PCT Pub. No.: WO94/10811

PCT Pub. Date: May 11, 1994

[30] Foreign Application Priority Data

Nov. 2, 1992 [DE] Germany ............................ 9214885 U

[51] Int. Cl.⁶ .................................................. H04B 7/212
[52] U.S. Cl. ............................ 370/280; 370/330; 379/58
[58] Field of Search ................................. 455/34.1, 54.1, 455/56.1, 63; 370/24, 29, 50, 92, 93, 95.1, 95.3; 379/58, 59, 60

[56] References Cited

U.S. PATENT DOCUMENTS

| | | | |
|---|---|---|---|
| 4,525,835 | 7/1985 | Vance et al. | 370/29 |
| 5,134,710 | 7/1992 | Akerberg | 370/29 |
| 5,291,475 | 3/1994 | Bruckert | 370/95.1 |
| 5,371,780 | 12/1994 | Amitay | 379/60 |
| 5,440,544 | 8/1995 | Zinzer, Jr. | 370/50 |

FOREIGN PATENT DOCUMENTS

| | | |
|---|---|---|
| 4150116 | 5/1992 | Japan. |
| 2249922 | 5/1992 | United Kingdom. |

OTHER PUBLICATIONS

"Auch ohne Schnue >>auf Draht<<", Klaus Wolf, Siemens AG, Telcom report 10 (1987), pp. 130–137, in particular, pp. 134 and 135.

"Digital European Cordless Telecommunications System" (DECT) Standard (draft prETS 300 175–1) pp. 1–31 Aug. 1991.

"Digital European Cordless Telecommunications System" (DECT) Standard (draft prETS 300 175–2) pp. 1–36 Aug. 1991.

"Digital European Cordless Telecommunications System" (DECT) Standard (draft prETS 300 175–3) pp. 1–177 Aug. 1991.

*Primary Examiner*—Benedict V. Safourek
*Attorney, Agent, or Firm*—Hill, Steadman & Simpson

[57] ABSTRACT

A wire-free telecommunications system having a plurality of base stations and mobile elements which form a wire-free telecommunications subsystem. Each of the base stations, and each of the mobile elements has a circuit arrangement to which is assigned a controlling program. The system has radio links at predetermined frequencies and in a plurality of time slots in time-division multiplex channels. The controlling program uses only a subset of time slots which do not follow one another directly, from a number of time slots, which are predetermined for the radio links.

2 Claims, 3 Drawing Sheets

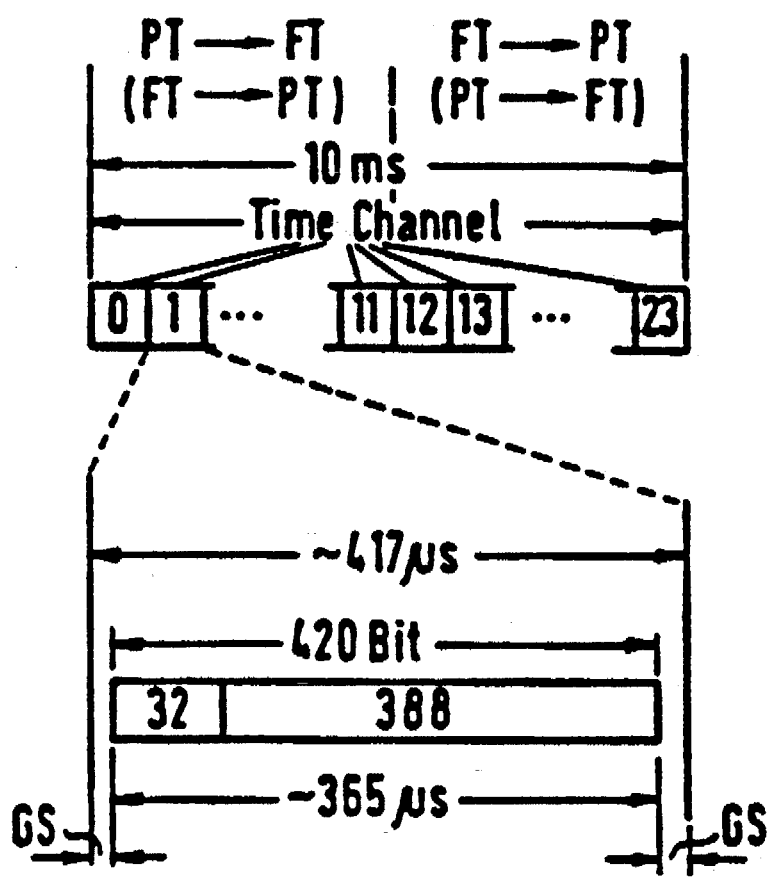

WIRE-FREE TELECOMMUNICATIONS SYSTEM, PREFERABLY A CORDLESS TELECOMMUNICATIONS SYSTEM

BACKGROUND OF THE INVENTION

The invention relates to a wire-free telecommunications system, preferably a cordless telecommunications system having a plurality of base stations and mobile elements.

In wire-free telecommunications systems—such as mobile radio or cordless telecommunications systems for example—having a plurality of base stations and mobile elements which form telecommunications subsystems and use, for example, the time division multiple access method TDMA (Time Division Multiple Access) or the code division multiple access method CDMA (Code Division Multiple Access), optimum channel utilization in the telecommunications subsystems (in the sense of no mutual interference between the channels in the telecommunications subsystems) can be achieved only if the telecommunications subsystems, which are based, for example, on the TDMA principle, are synchronized (no drift between the time bases of the telecommunications subsystems) (synchronous wire-free telecommunications system).

In asynchronous wire-free telecommunications systems, in contrast, in which drift occurs between the time bases of the telecommunications subsystems, mutual interference between the channels of the telecommunications subsystems can occur as a result of the drift of the time bases, which interference severely reduces the overall channel selection which can be used in the respective telecommunications subsystem in unfavorable cases.

SUMMARY OF THE INVENTION

The object on which the invention is based is to specify a wire-free telecommunications system, preferably a cordless telecommunications system of the type mentioned initially, in the case of which there is no mutual interference between telecommunications subsystems.

This object is achieved by a wire-free telecommunications system, preferably a cordless telecommunications system, having a plurality of base stations and mobile elements which each form a wire-free telecommunications subsystem. The base stations and the mobile elements respectively have a circuit arrangement to which is assigned a controlling program. The controlling program is designed such that radio links take place at predetermined frequencies (Frequency Division Multiple Access FDMA) and in a plurality of time slots in time-division multiplex channels (Time Division Multiple Access TDMA). The controlling program is furthermore designed such that only a subset of time slots, which do not directly follow one another, is selected from a number of predetermined time slots for the radio links.

It can be regarded as being essential to the invention in this case that only a subset of the time slots which are available overall in the telecommunications subsystems of the wire-free telecommunications system (for example every other time slot) is used. In consequence, the usable channel capacity of the wire-free telecommunications subsystem or telecommunications system is admittedly reduced, but the reduced channel capacity is preferably not less if, to be precise, all the time slots which are available in the telecommunications subsystems are used, but only half of these are available, rather than all of them, because of interference in which a channel a of a telecommunications subsystem A interferes with two channels b1, b2 of a telecommunications subsystem B.

In an advantageous development of the invention only every other time slot is selected from the number of predetermined time slots for the radio links.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 shows a TDMA time frame of a cordless telecommunications subsystem using the; DECT Standard.

DESCRIPTION OF THE PREFERRED EMBODIMENTS

Figure 1:
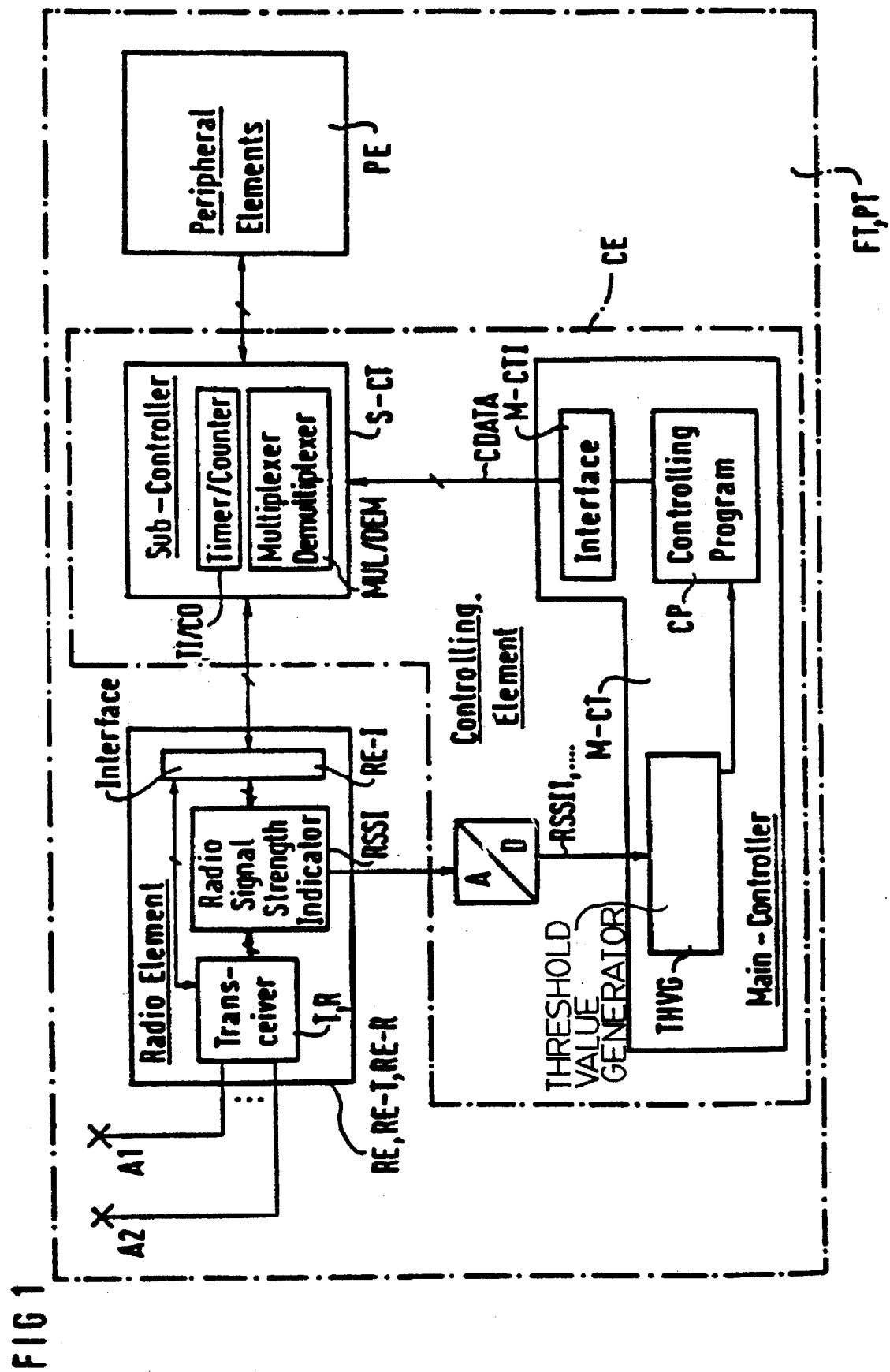
FIG. 1 shows the outline of the construction of a base station or of a mobile element of a cordless telecommunications subsystem.

FIG. 1 shows the outline of the circuit construction of a base station FT or of a mobile element PT of a cordless telecommunications system. Both the base station FT and the mobile element PT contain a radio element RE—also referred to as the transceiver device RE-T, RE-R in the following text—, a controlling element CE and peripheral circuit elements (peripheral elements) PE, which are combined in the "peripheral elements" functional block. The following description assumes that the DECT Standard (Digital European Cordless Telecommunication) is implemented for the cordless telecommunications subsystem. However, the invention is not limited to this. The invention can thus also be used directly on comparable standards, such as the CT2 or GSM Standard, for example.

While the base station FT and the mobile element PT do not differ with respect to the controlling element CE and the radio element RE or the transceiver device RE-T, RE-R—to the extent of the consideration relevant to the invention—, the peripheral circuit elements PE of the base station FT and of the mobile element PT are constructed differently.

Thus, the peripheral circuit elements PE in the base station FT based on base stations of known cordless telephone systems (Wolf, Klaus: "Auch ohne Schnur "auf Draht"" [Without any cord "by wire"], Telcom Report 10, 1987, Issue 2, pages 130 et seq., for example page 134)—comprise, for example, internal subscriber circuits and exchange or private branch exchange circuits having upstream ADPCM encoding/decoding devices and an internal peripheral controller. The peripheral circuit elements PE of the mobile element PT—based on mobile elements of known cordless telephone systems (Telcom Report 10, 1987, Issue 2, page 135)—contain, for example, a microphone, a piezo receiver capsule, a piezo tone caller, an accumulator, a keyboard, an LED display and NF and tone caller amplifiers.

The peripheral circuit elements PE stated above in the base station FT and in the mobile element PT can also be replaced by other circuit elements, without any limitation of the invention.

Those elements of the circuit construction of the base station FT and of the mobile element PT according to FIG.

1 which are relevant to the invention are the radio element RE, or the transceiver device RE-T, RE-R, and the controlling element CE. Two antennas A1, A2, which operate both as transmitting and receiving antennas, are in this case assigned to the radio element RE for transmitting and receiving radio signals (for example TDMA or CDMA radio signals). Alternatively, it is also possible, however, without any limitation of the invention, to assign one antenna or more than two antennas to the radio element RE.

Furthermore—as is illustrated lay three functional blocks in FIG. 1—the radio element RE has a transceiver element T,R, a field strength measuring device (Radio Signal Strength Indicator) RSSI and an interface device RE-I, which are connected to one another in the radio element RE in the manner illustrated. The field strength measuring device RSSI measures the field strength of the radio signals selected via the antennas A1, A2 and in the transceiver element T, R.

The field strength measuring device RSSI is generally used for testing whether a channel is busy (cf. DECT Draft prETS 300 175-3: 1991, page 164). The instruction on how the field strength can be measured is specified in the DECT Standard (cf. DECT Draft prETS 300 175-2: 1991, page 31, 6.2 and page 38, 8.3). The occupancy of the channel is in this case confirmed by measuring the field strength (minimum field strength) of received radio signals, the measurement results RSSI1, . . . subsequently being fed via an analog/digital converter A/D to a threshold value generator THVG (THreshold Value Generator) which is integrated in a main processor M-CT of the controlling element CE. The threshold value generator THVG in this case continuously forms updated values during continuous operation of the base station FT or of the mobile element PT, which values are linked by the main processor M-CT to a controlling program CP and are used for selecting the antennas A1, A2. The controlling program CP uses the information obtained from the threshold value generator THVG on the channel occupancy (input variable) to form controlling data CDATA, which are fed via a main processor interface M-CTI to a subprocessor (subcontroller) S-CT.

The subprocessor S-CT is designated as the Time Switch Controller in the base station FT and as the Burst Mode Controller in the mobile element PT. Assigned to the subprocessor S-CT, inter alia, is a multiplexer/demultiplexer unit MUL/D, EM, which respectively produces and receives 1.152 Mbit/s data using the DECT burst format.

Furthermore, the subprocessor S-CT carries out controlling tasks for the radio element RE and the peripheral circuit elements PE. In the case of the base station FT, the multiplexer/demultiplexer unit MUL/DEM of the subprocessor S-CT assigns to the received data packets and to the data packets to be transmitted, respectively, for example up to six internal and three external telephone connections, respectively, using the time division multiple access method TDMA (Time Division Multiple Access) or using the code division multiple access method CDMA (Code Division Multiple Access). Furthermore, the subprocessor S-CT contains a timer/counter TI/CO which clocks the subprocessor S-CT, preferably with respect to the occurrence in time of bits, time slots and TDMA or CDMA frames.

The method of operation of cordless telecommunication in a cordless telecommunications system having the base station FT and the mobile element PT according to FIG. 1 is indicated in principle by the documents already mentioned (Telcom Report 10, 1987, Issue 2, pages 130 et seq., and DECT Draft prETS 175-3: 1991, entire document). Thus, a plurality of frequencies (FDMA=Frequency Division Multiple Access) and, subsequently to this, a plurality of time slots of time-division multiplex channels (TDMA=Time Division Multiple Access) are assigned in the cordless telecommunications subsystem to bidirectional (transmitter/receiver and receiver/transmitter) radio links. In so doing, in the case of the bidirectional radio link in the cordless telecommunications subsystem between the base station FT and the mobile element PT speech is, on the one hand, compressed and transmitted at the transmitting end and, on the other hand, it is received and expanded at the receiving end.

In order to keep low the mutual interference from channels of the cordless telecommunications subsystems in a wire-free telecommunications system, the controlling program CP which is assigned to the main processor M-CT of the controlling element CE in the base station FT or the mobile element TT according to FIG. 1 is designed in such a manner that, using the controlling data CDATA which is fed to the subprocessor S-CT, only a subset of time slots which do not follow one another directly (for example only every other time slot 0, 2, 4, . . . 10, 12, 14, . . . 22; or 0, 3, 6, 9, 12, 15, 18, 21) is selected, from a number of predetermined time slots (FIG. 2), for the radio links.

FIG. 2 shows a DECT-specific TDMA time frame for cordless telephone systems according to the DECT Standard. A dynamic channel selection from approximately 120 available channels is carried out, according to the DECT Standard, for cordless communication. The 120 channels result from the fact that ten frequency bands between 1.8 and 1.9 GHz are used in the DECT Standard, a time-division multiplex frame of 10 ms being used in time-division multiplex (TDMA=Time Division Multiple Access) in each frequency band according to the illustration in FIG. 3. 24 (from 0 to 23) time channels are defined in this time-division multiplex frame, and a frame scheme is thus specified. This frame scheme is then used in such a manner that, for each frequency band, for example 12 mobile elements PT can be operated simultaneously in duplex mode (PT-FT and FT-PT or FT-PT and PT-FT) with one base station FT of a DECT communications system. In this case, one time slot of 417 µs in each case is assigned to the 24 time channels. In this case, this time slot indicates the time in which information (data) is transmitted. This transmission of information in the duplex mode is also called the ping-pong method because transmission is carried out at a specific time, and reception is carried out at a different time. In the case of this ping-pong method, one time frame or pulse (burst) of 365 µs, which corresponds approximately to a frame length of 420 bits, is transmitted in each time slot, with a data rate of 42 kbit/s. Taking into account the fact that 30 bits are in each case available, in order to avoid adjacent time slots overlapping, at both ends of the time frame in a guard space (GS) this results in an overall data rate of 1.152 Mbit/s related to the time-division multiplex frame.

FIG. 3 shows mutual interference STB between two synchronous wire-free telecommunications subsystems S-TKTS1, S-TKTS2 (FIG. 3a, FIG. 3b) and asynchronous wire-free telecommunications subsystems AS-TKTS1, AS-TKTS2 (FIG. 3c, FIG. 3d) of a wire-free telecommunications system TKS with respect to time slots ZS and channels K of the telecommunications subsystems.

The wire-free telecommunications system TKS is synchronous when a firmly specified and constant phase (no drift) exists between the time bases ZB1, ZB2 of the telecommunications subsystems S-TKTS1, S-TKTS2. In contrast to this, the wire-free telecommunications system TKS is asynchronous when a variable phase (drift of the time bases ZB1, ZB2) exists between the time bases ZB1, ZB2 of the telecommunications subsystems AS-TKTS1, AS-TKTS2.

Figure 3A:
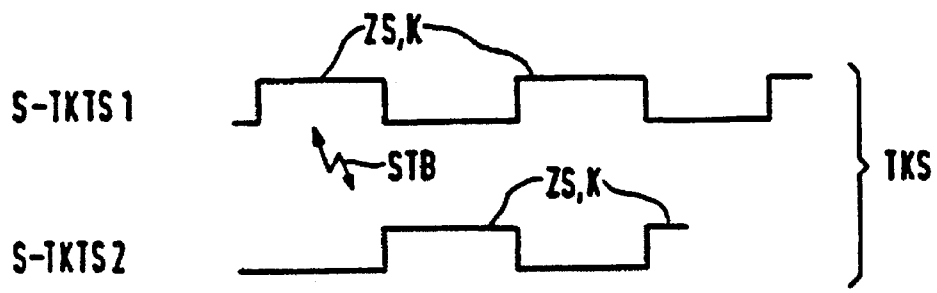
FIGS. 3a–3d show diagrams for in each case two synchronous and asynchronous wire-free telecommunications subsystems based on the TDMA principle, and the level of interference resulting from the channels of the wire-free telecommunications subsystems.
Figure 3B:
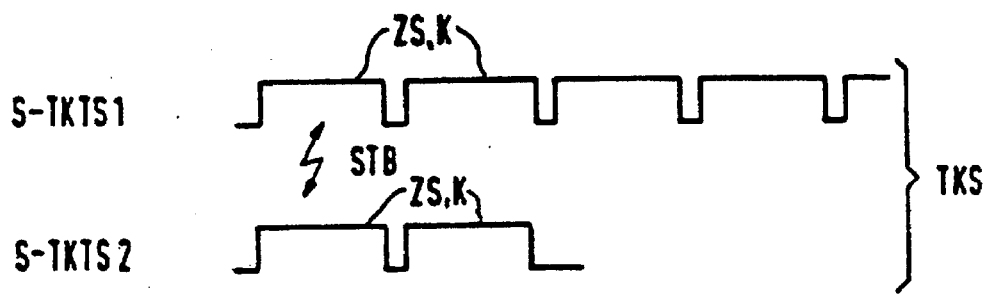

The level of interference STB in the synchronous telecommunications subsystems S-TKTS1, S-TKTS2 according to FIG. 3a is 0% because of the antiphase synchronicity, while it is 100% in the case of the synchronous telecommunications subsystems S-TKTS1, S-TKTS2 according to FIG. 3b, because of the in-phase synchronicity.

Figure 3C:
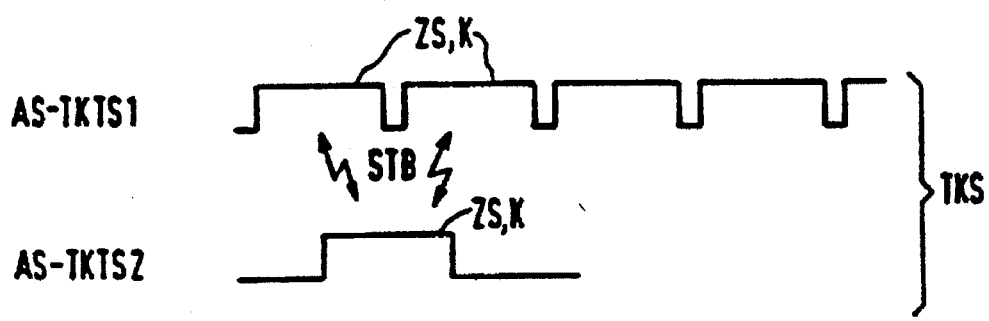

The level of interference STB; in the case of the asynchronous telecommunications subsystem AS-TKTS1, AS-TKTS2 according to FIG. 3c is between 100% (maximum value) and slightly above 50% (minimum value) depending on the magnitude of the drift of the time bases ZB1, ZB2 in the telecommunications subsystems AS-TKTS1, AS-TKTS2.

Figure 3D:
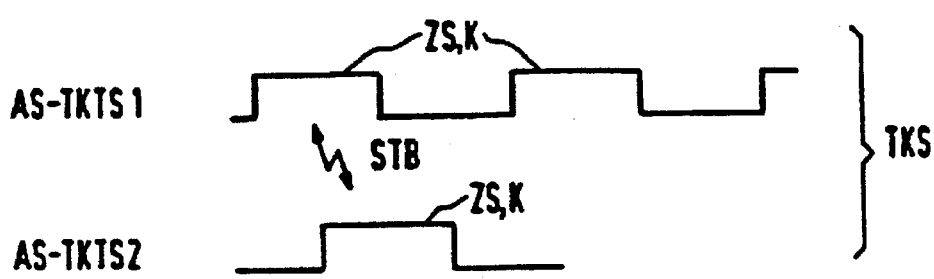

The level of interference STB in the case of the asynchronous telecommunications subsystems AS-TKTS1, AS-TKTS2 according to the invention and according to FIG. 3d is a statistical mean of 50% if, in contrast to the asynchronous telecommunications system TKS according to FIG. 3c, only every other time slot ZS, for example, is selected. This is equivalent to a further time slot being arranged between the two selected time slots ZS, which further time slot is not used for radio links.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A wire-free telecommunications system having a plurality of base stations and mobile elements which form a wire-free telecommunications subsystem, the wire-free telecommunications system comprising:

each of the base stations and each of the mobile elements having a circuit arrangement to which is assigned a controlling program;

the controlling program forming radio links at predetermined frequencies and in a plurality of time slots in time-division multiplex channels, the controlling program selecting for forming the radio links only a subset of time slots which do not follow one another directly, from a number of time slots of the plurality of time slots, said number of time slots being predetermined for the radio links within one time division multiplex frame.

2. The wire-free telecommunications system as claimed in claim 1, wherein only every other time slot is selected, from the number of predetermined time slots, for the radio links.

* * * * *